United States Patent
Fournier et al.

(10) Patent No.: US 12,179,791 B2
(45) Date of Patent: Dec. 31, 2024

(54) METHOD AND DEVICE FOR OPERATING AN AUTOMATED VEHICLE

(71) Applicant: Robert Bosch GmbH, Stuttgart (DE)

(72) Inventors: Norman Fournier, Stuttgart (DE); Stephanie Arramon, Renningen (DE); Svetlana Rau, Stuttgart (DE); Tjark Vandommele, Biberach (DE); Ulf Wilhelm, Schwaikheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 81 days.

(21) Appl. No.: 17/435,996

(22) PCT Filed: Feb. 10, 2020

(86) PCT No.: PCT/EP2020/053258
§ 371 (c)(1),
(2) Date: Sep. 2, 2021

(87) PCT Pub. No.: WO2020/177980
PCT Pub. Date: Sep. 10, 2020

(65) Prior Publication Data
US 2022/0153293 A1    May 19, 2022

(30) Foreign Application Priority Data
Mar. 5, 2019   (DE) .......................... 102019202925.6

(51) Int. Cl.
*B60W 60/00* (2020.01)
*B60W 40/04* (2006.01)
(Continued)

(52) U.S. Cl.
CPC .......... *B60W 60/001* (2020.02); *B60W 40/04* (2013.01); *G06V 20/56* (2022.01); *B60W 2050/0028* (2013.01)

(58) Field of Classification Search
CPC ............... B60W 60/001; B60W 40/04; B60W 2050/0028; B60W 50/023;
(Continued)

(56) References Cited

U.S. PATENT DOCUMENTS

2009/0268947 A1* 10/2009 Schaufler ............... G06V 20/58
2015/0210258 A1*  7/2015 Erdem ..................... B60T 8/00
(Continued)

FOREIGN PATENT DOCUMENTS

CN        107077606 A       8/2017
DE     102010063792 A1      6/2012
(Continued)

OTHER PUBLICATIONS

International Search Report for PCT/EP2020/053258 Issued May 13, 2020.
(Continued)

*Primary Examiner* — Russell Frejd
*Assistant Examiner* — Ellis B. Ramirez
(74) *Attorney, Agent, or Firm* — NORTON ROSE FULBRIGHT US LLP; Gerard A. Messina

(57) ABSTRACT

A method for operating an automated vehicle. The method includes: detecting surroundings of the vehicle; providing surroundings data of the detected surroundings; supplying the surroundings data to a situation detection unit including a defined number greater than one of situation detection elements; computationally modeling the surroundings of the vehicle with the aid of the situation detection elements; activating driver assistance systems using output data of the models of the situation detection elements; deciding, with the aid of a decision-making unit, which output data of the models of the situation detection elements are used for activating an actuator unit of the vehicle; and activating the actuator unit of the vehicle using the decided-upon output data.

12 Claims, 3 Drawing Sheets

(51) Int. Cl.
  *B60W 50/00* (2006.01)
  *G06V 20/56* (2022.01)
(58) Field of Classification Search
  CPC . B60W 2556/35; G06V 20/56; G05D 1/0077; G05D 2201/0213; G05D 1/0088; G05B 19/0421
  USPC .............. 701/23; 714/11; 340/508; 244/99.4
  See application file for complete search history.

(56) References Cited

U.S. PATENT DOCUMENTS

| | | | | |
|---|---|---|---|---|
| 2015/0307110 | A1* | 10/2015 | Grewe | B60W 50/029 |
| 2018/0173232 | A1* | 6/2018 | Schwindt | G05D 1/0088 |
| 2018/0268695 | A1* | 9/2018 | Agnew | B60K 28/066 |
| 2018/0314921 | A1* | 11/2018 | Mercep | G01S 7/539 |
| 2019/0018415 | A1* | 1/2019 | Netter | G08G 1/096775 |
| 2021/0101607 | A1* | 4/2021 | Du | B60W 50/04 |
| 2021/0179122 | A1* | 6/2021 | Zhu | B60W 10/18 |

FOREIGN PATENT DOCUMENTS

| | | |
|---|---|---|
| DE | 102015209853 A1 | 12/2016 |
| DE | 102015222605 A1 | 5/2017 |
| DE | 102017204603 A1 | 9/2018 |
| DE | 102017205495 A1 | 10/2018 |
| EP | 1369288 A2 | 12/2003 |
| EP | 2107503 A1 | 10/2009 |

OTHER PUBLICATIONS

Hui, et al.: "Assistant driving decision method of vehicle lane change based on dynamic probability grid and Bayesian decision network," Journal of Traffic and Transportation Engineering, 18(2), (2018), pp. 1-11, with English Abstract.

* cited by examiner

METHOD AND DEVICE FOR OPERATING AN AUTOMATED VEHICLE

FIELD

The present invention relates to a method for operating an automated vehicle. The present invention furthermore relates to a device for operating an automated vehicle. The present invention furthermore relates to a computer program product.

BACKGROUND INFORMATION

Data from surroundings sensors are already used today to take over specific driving tasks of a vehicle. For example, surroundings sensor data are used to control emergency braking assistance (autonomous emergency braking, AEB) or adaptive cruise control (ACC) systems. The surroundings sensor data are typically ascertained by radar sensors and/or cameras for the implementation of functions such as AEB or ACC. All these functions have in common that their field of action is drastically limited.

German Patent Application No. DE 10 2015 222 605 A1 describes a method for the assisted, semi-automated, highly automated, fully automated or driverless driving of a motor vehicle. In the process, it may be provided that all subsystems have a monitoring function and communicate their performance capability to the control unit, it furthermore being possible to be provided that individual subsystems quantitatively communicate the performance capability, and others communicate it only qualitatively.

European Patent Application No. EP 1 369 288 A2 describes a vehicle control unit which includes a vehicle control subsystem.

SUMMARY

It is an object of the present invention to provide an improved method for operating an automated vehicle.

According to a first aspect of the present invention, the object may be achieved by a method for operating an automated vehicle.

In accordance with an example embodiment of the present invention, the method includes the following steps:
  detecting surroundings of the vehicle;
  providing surroundings data of the detected surroundings;
  supplying the surroundings data to a situation detection unit including a defined number greater than one of situation detection elements;
  computationally modeling the surroundings of the vehicle with the aid of the situation detection elements;
  activating driver assistance systems using output data of the models of the situation detection elements;
  deciding, with the aid of a decision-making unit, which output data of the models of the situation detection elements are used for activating an actuator unit of the vehicle; and
  activating the actuator unit of the vehicle using the decided-upon output data.

In this way, vehicles driving in an automated manner up to Level 5 (autonomous vehicles) may advantageously be implemented. Advantageously, this is possible, using the present invention, by a conservative use of hardware resources, by which the method may be implemented using relatively small control units. The computing effort is thus reduced, and faster computing cycles may be carried out. As a result, a real time-capable system for operating an automated vehicle is thus provided.

According to a second aspect of the present invention, the object is achieved by a device for operating an automated vehicle. In accordance with an example embodiment of the present invention, the device includes:
  a surroundings sensor unit for detecting surroundings of the vehicle and for providing surroundings data of the detected surroundings;
  a situation detection unit including a defined number greater than one of situation detection elements to which the surroundings data may be supplied, it being possible to carry out a computational modeling of the surroundings of the vehicle with the aid of the situation detection elements;
  driver assistance systems which are activatable using output data of the models of the situation detection elements;
  a decision-making unit with the aid of which it is decidable which output data of the models of the situation detection elements are used for activating an actuator unit of the vehicle; and
  an actuator unit of the vehicle which is activatable using the decided-upon output data.

Advantageous refinements of the method are disclosed herein.

One advantageous refinement of the method in accordance with the present invention provides that the models of the situation detection elements are synchronously ascertained independently of one another, the models of the situation detection elements overlapping at least partially. In this way, a robustness of the system is supported since, in the event of a failure of a situation detection element, an active driver assistance system may continue to be operated.

One further advantageous refinement of the method in accordance with the present invention provides that the driver assistance systems are carried out independently of one another and synchronously. This also supports an independence and a robustness of the method.

One further advantageous refinement of the method in accordance with the present invention provides that different data are provided from a sensor of the surroundings sensor unit for different situation detection elements. For example, it may be provided that a video camera for detecting traffic lanes and objects is used, these different pieces of information being used by different situation detection elements.

One further advantageous refinement of the method in accordance with the present invention is characterized in that it is ascertained with the aid of a self-assessment unit of each situation detection element how trustworthy the models of the particular situation detection element are. A decision aid as to which situation detection element is trusted is thus provided to a decision maker, and the situation detection element is then selected.

One further advantageous refinement of the method in accordance with the present invention is characterized in that data are provided for all driver assistance systems with the aid of the models of the situation detection elements. In this way, all driver assistance systems are activated using the same data of the situation detection elements, by which a robustness of the method is also supported.

One further advantageous refinement of the method in accordance with the present invention provides that the driver assistance system decides which data of which situation detection element it processes. In this way, a robustness of the method is also advantageously increased.

In one further advantageous refinement of the method in accordance with the present invention, a decision-making unit of the function unit decides which data of which driver assistance system it processes. In this way, it is ultimately decided which data are processed and to which actuator the data are supplied.

One further advantageous refinement of the method in accordance with the present invention provides that each situation detection element evaluates behavioral data of the vehicle using the same metric in each case, the metrics of the situation detection elements encompassing at least one of the following: collision likelihood, resource conservation, environmental sustainability, legality. An important metric in the process is as low a collision likelihood as possible, with the aid of which a collision of the vehicle may largely be avoided.

The present invention is described in detail hereafter with further features and advantages based on several figures. In the process, technical features and advantages of the described device result similarly from technical features and the device from the described method.

DETAILED DESCRIPTION OF EXAMPLE EMBODIMENTS

In accordance with present invention, driving tasks of an automated vehicle are implemented in as large a range of use as possible. Advantageously, in this way a method for autonomous driving up to Level 5 (definition of Level 5: "the full-time performance by an automated driving system of all aspects of the dynamic driving task under all roadway and environmental conditions that can be managed by a human driver") may be used.

For this purpose, according to an example embodiment of the present invention a so-called "multi-agent approach" is provided, which allows autonomous driving up to Level 5 to be implemented. Each so-called "agent" in the form of a situation detection element $51a \ldots 51n$ simplifies the so-called "open world problem" (possible autonomous driving at Level 5 worldwide) using a mathematical model to be determined approximately exactly. The different agents or situation detection elements $51a \ldots 51n$ are designed in the process in such a way that their models use approximately independent states. For example, a situation detection element $51a \ldots 51n$ is engaged in the detection of traffic lanes, another situation element $51a \ldots 51n$ is engaged in the detection of objects, etc. As a result, the sum of all situation detection elements $51a \ldots 51n$ covers the entire field of action of the automated vehicle which is required for autonomous driving.

Advantageously, it is thus possible to implement the solution to the open world problem in real time using limited hardware resources due to the simplification into a model to be mathematically approximately exactly determined.

Today, vehicles are in general equipped with different surroundings sensors (e.g., radar, camera, ultrasound, LIDAR, infrared camera, etc.). Surroundings data are detected with the aid of these surroundings sensors. Functions for coping with specific driving tasks may then be implemented from these surroundings data. Usually, certain surroundings sensors are specialized in specific driving tasks, e.g., ultrasonic sensors for parking tasks, radar sensors for adaptive cruise control systems, etc.

With respect to functions of autonomous driving, it is provided that a combination of multiple different surroundings sensors is provided to create a hardware redundancy. A method is described, which allows autonomous driving to be implemented with hardware and software redundancy.

Figure 1:
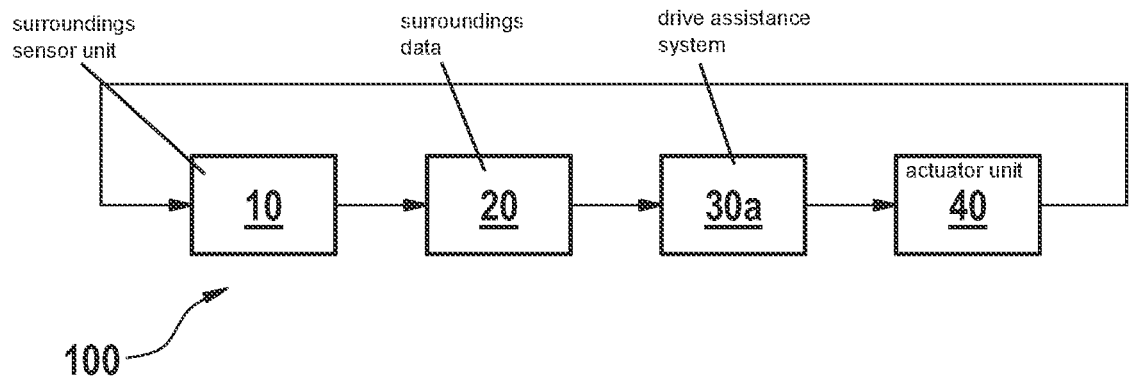
FIG. 1 shows a schematic representation of a conventional device for operating an automated vehicle.

A driver assistance system is a system which is to achieve a driving task, for example staying in a lane. A driver assistance system typically functions as shown in FIG. 1.

Figure 2:
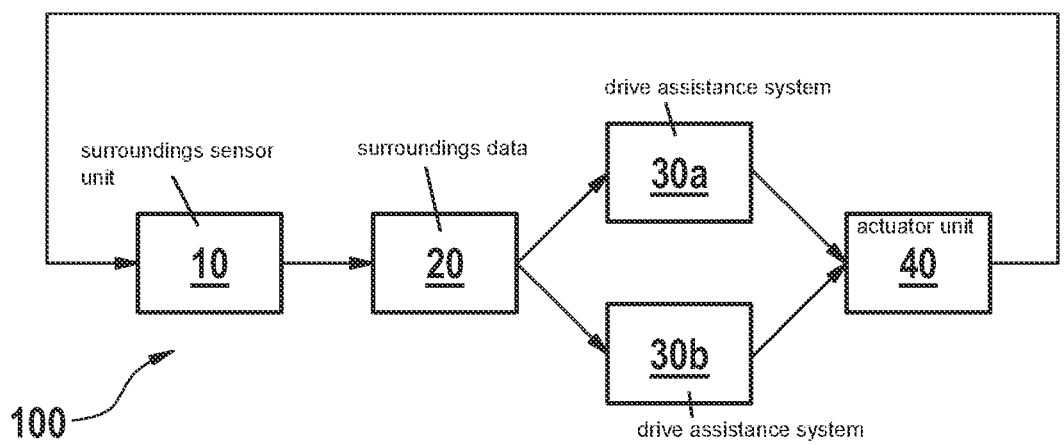
FIG. 2 shows a further representation of a further conventional device for operating an automated vehicle.

A surroundings sensor unit 10 is used for ascertaining surroundings data 20. Surroundings data 20 are analyzed in a driver assistance system 30a, an achievement of the driving task being provided based on the result of this analysis. Using this achievement of the driving task, an actuator unit 40, e.g., in the form of a steering system and/or a brake of the vehicle (not shown), is then activated. When a vehicle includes multiple driver assistance systems 30a . . . 30n, there may also be multiple parallel instances of such a logic, as is shown, for example, in FIG. 2.

Figure 3:
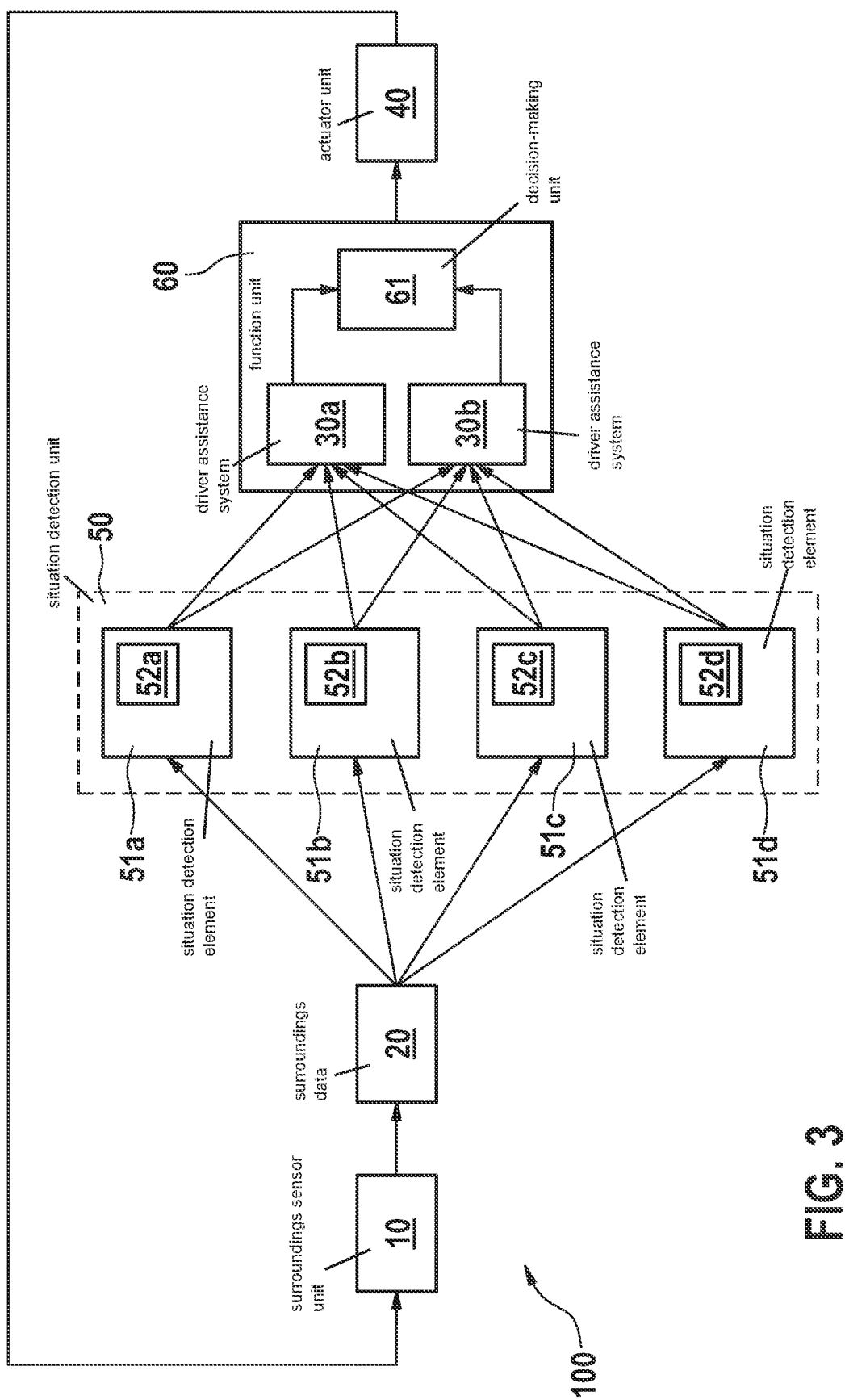
FIG. 3 shows a schematic representation of a first specific embodiment of a provided device for operating an automated vehicle in accordance with an example embodiment of the present invention.

FIG. 3 shows one specific embodiment of a device 100 according to an example embodiment of the present invention for operating an automated vehicle.

It is apparent that a situation detection unit 50 is additionally introduced into the closed loop information path in the method described here. As was already the case with the above-described driver assistance systems 30a . . . 30n, the flow of information begins with surroundings sensor unit 10.

They ascertain surroundings data 20, the surroundings data from different surroundings sensors (e.g., ultrasonic, radar, LIDAR, camera, etc.) of surroundings sensor unit 10 being subjected to a plausibility check and fused. Surroundings data 20 are preferably provided by different sensor types, by which the sensor data of the different sensors are compared. If, e.g., an object was detected by a radar sensor and by a video sensor, the likelihood is high that this object actually exists. The pieces of information thus fused and subjected to a plausibility check are forwarded to situation detection unit 50. These processed surroundings data 20 are further processed in situation detection unit 50 by multiple agents in the form of situation detection elements $51a \ldots 51n$.

Situation detection elements $51a \ldots 51n$ of situation detection unit 50 abstract the surroundings of the vehicle into simplifying mathematical models. In the process, each situation detection element $51a \ldots 51n$ of situation detection unit 50 is designed or programmed in such a way that it uses approximately independent pieces of information. Degrees of freedom of an object may be limited, for example, with the aid of a situation detection element $51a \ldots 51n$, e.g., a movement of the vehicle when driving straight ahead on a flat expressway in the z direction may be precluded. In this way, e.g., a situation detection element $51a \ldots 51n$ may be provided to detect, based on the processed, as described above, surroundings data, roadway markings or traffic lanes, while another situation detection element $51a \ldots 51n$ may be provided to ascertain, based on the described surroundings data, an interrelationship between moving objects, etc.

Each situation detection element 51a ... 51n thus takes over the task of assessing different behaviors of the vehicle with the aid of specific metrics (e.g., collision likelihood, resource conservation, environmental sustainability, legality of a vehicle behavior, etc.). The metric of the collision likelihood between objects is generally given the highest priority. All situation detection elements 51a . . . 51n preferably use the same metrics, so that in this way the different situation detection elements 51a . . . 51n, and the behaviors generated therefrom, may be compared to one another.

Exemplary behaviors of the vehicles are "driving in the lane," "carrying out a lane change," "decelerating," "accelerating," "navigating to a parking space," etc. The following situation detection elements 51a . . . 51n may, for example, have overlapping fields of action:

Situation detection element A: Consideration of all objects which may be assigned to one lane Situation detection element B: Consideration of all objects In this example, all objects detected by situation detection element A: are in the field of action of situation detection element B. This statement does not apply the other way around.

The assessment of the different behaviors is implemented by a generic set of metrics, each behavior being assessed by each situation detection element 51a . . . 51n using the particular metric specific to it.

In addition to the assessment of the behavior, another task of each situation detection element 51a . . . 51n is to provide a self-assessment with the aid of a self-assessment unit 52a . . . 52n. This self-assessment states how trustworthy the assessments of the behaviors by the particular situation detection element 51a . . . 51n are. The self-assessment of each situation detection element 51a . . . 51n is preferably computed based on quality criteria of the input signals which the particular situation detection element 51a . . . 51n uses for its computations. In addition, it may be checked whether it is possible to adhere to the basic assumptions of situation detection element 51a . . . 51n in the present situation. The assessed behaviors and the self-assessments of situation detection elements 51a . . . 51n are forwarded by situation detection unit 50 to a function unit 60 including a decision-making unit 61.

In function unit 60, the assessed behaviors are used to implement the various driver assistance systems 30a . . . 30n (e.g., AEB, ACC, LKA (lane-keeping assist), etc.) which are to carry out the driving tasks. In the process, only a single driver assistance system 30a . . . 30n at a time may be active in a defined time frame since the various driver assistance systems 30a . . . 30n compete with one another. In the process, the different assessed behaviors of the vehicle are compared to one another in the form of surrounding data which have been subjected to a plausibility check and fused. In the process, the function is selected which meets the desired driving task in the best possible manner using the associated behavior, and in the process represents the lowest collision likelihood or collision risk for the vehicle.

When a situation detection element 51a . . . 51n reports that its self-assessment is very low, function unit 60 may, for example, ignore the assessment of this situation detection element 51a . . . 51n, and use the assessment of another situation detection element 51a . . . 51n. Finally, the actuators of actuator unit 40, e.g., in the form of a steering system and/or brake of the vehicle, are activated based on the decision in favor of a behavior and the associated function. In the case of ACC as the selected driver assistance system 30a . . . 30n, the engine of the vehicle is typically activated. In the case of LKA as the selected driver assistance system, the steering system of the vehicle is typically activated. In the process, it may be provided, for example, that the steering system is activated using trajectory data. As a result, the vehicle thus executes its driving task according to the assessed behavior.

Optionally, it may also be provided that a driver assistance system 30a . . . 30n is activated by multiple, different situation detection elements 51a . . . 51n. In the process, however, it is not absolutely necessary that each situation detection element 51a . . . 51n is able to implement every function.

The described method has, in particular, the following advantages compared to traditional conventional driver assistance systems:

Situation detection elements 51a . . . 51n carry out an abstraction into simple mathematical models of the surroundings, by which hardware resources are conserved As a result of situation detection elements 51a . . . 51n, the computing time may be shortened, and thus a real time-capable system may be provided As a result of the provision of multiple situation detection elements 51a . . . 51n having an overlapping field of action, a software redundancy is created, in addition to the hardware redundancy due to multiple surroundings sensor types of surroundings sensor unit 10. As a result, the system thus continues to be functional even in the event of a failure of one situation detection element 51a . . . 51n Special tasks may be achieved by the development of dedicated agents. For example, a situation detection element which is only based on the ego vehicle data when, e.g., all surroundings sensor fail could be provided. This situation detection element could be used to decelerate the vehicle or to completely transfer the driving task to the human driver.

Device 100 is preferably designed as an electronic control unit of the vehicle on which a computer program product (e.g., program code in the form of C++) is executed.

Figure 4:
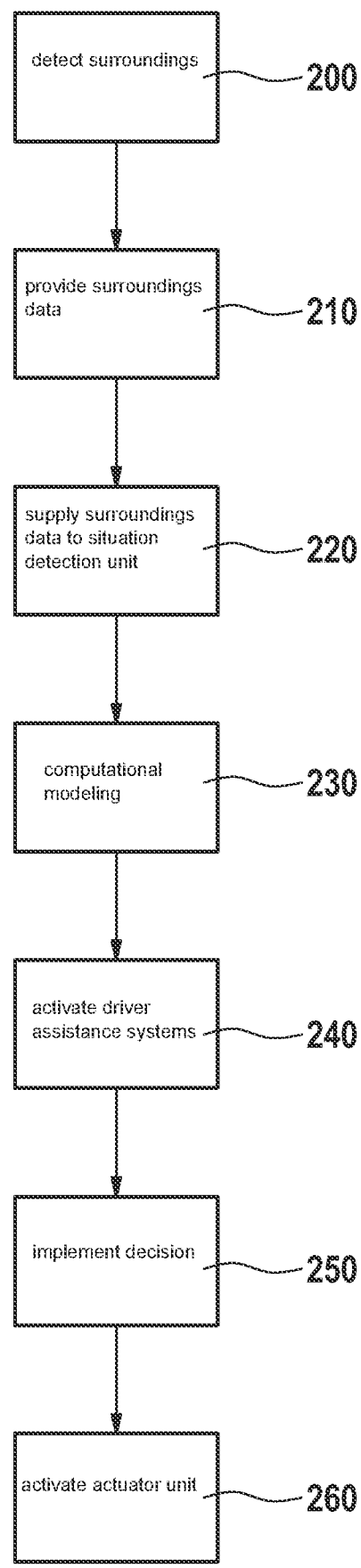
FIG. 4 shows a schematic representation of a flowchart of a provided method for operating an automated vehicle, in accordance with an example embodiment of the present invention.

FIG. 4 shows a schematic sequence of a described method for operating an automated vehicle convoy.

In a step 200, a detection of surroundings of the vehicle is carried out.

In a step 210, surroundings data 20 of the detected surroundings are provided.

In a step 220, surroundings data 20 are supplied to a situation detection unit 50 including a defined number greater than one of situation detection elements 51a . . . 51n.

In a step 230, a computational modeling of the surroundings of the vehicle is carried out with the aid of situation detection elements 51a . . . 51n.

In a step 240, an activation of driver assistance systems 30a . . . 30n using output data of the models of situation detection elements 51a . . . 51n is carried out.

In a step 250, a decision is implemented with the aid of a decision-making unit 61, which uses output data of the models of situation detection elements 51a . . . 51n for activating an actuator unit 40 of the vehicle.

In a step 260, actuator unit 40 of the vehicle is activated using the decided-upon output data.

The method according to the present invention may advantageously be implemented as software which runs, for example, on an electronic control unit in the vehicle or in a cloud-based manner on a server unit. This supports an easy adaptability of the method.

Those skilled in the art will suitably modify the features of the present invention and/or combine them with one another, without departing from the core of the present invention.

What is claimed is:

1. A method for operating an automated vehicle, comprising the following steps:
    detecting surroundings of the vehicle;
    providing surroundings data of the detected surroundings;
    supplying the surroundings data to a situation detection unit including a defined plurality of situation detection elements that are collectively present together at one time;
    computationally modeling the surroundings of the vehicle using the situation detection elements, wherein each of the situation detection elements determines a respective model corresponding to one of a plurality of aspects of the surroundings such that each of the plurality of aspects is independent of each other and such that a sum of the models of the situation detection elements covers an entire field of action of the surroundings;
    activating driver assistance systems using output data of the models of the situation detection elements;
    deciding, using a decision-making unit, which of the output data of the models of the situation detection elements are used for activating an actuator unit of the vehicle; and
    activating the actuator unit of the vehicle using the decided-upon output data.

2. The method as recited in claim 1, wherein the models of the situation detection elements are synchronously ascertained independently of one another, the models of the situation detection elements overlapping at least partially.

3. The method as recited in claim 1, wherein the driver assistance systems are activated independently of one another and synchronously.

4. The method as recited in claim 1, wherein different data are provided from a sensor of the surroundings sensor unit for different ones of the situation detection elements.

5. The method as recited in claim 1, further comprising:
    ascertaining, using a self-assessment unit of each situation detection element, the models of the situation detection element are.

6. The method as recited in claim 1, wherein data for all of the driver assistance systems are provided using the models of the situation detection elements.

7. The method as recited in claim 6, wherein each driver assistance system decides which data of which situation detection element it processes.

8. The method as recited in claim 7, wherein the decision-making unit of a function unit decides which data of which driver assistance system it processes.

9. The method as recited in claim 1, wherein each situation detection element assesses behavioral data of the vehicle using the same metric in each case, the metrics of the situation detection elements encompassing at least one of the following: collision likelihood, resource conservation, environmental sustainability, legality.

10. A device configured to operate an automated vehicle, comprising:
    a surroundings sensor unit configured to detect surroundings of the vehicle and to provide surroundings data of the detected surroundings;
    situation detection unit including a defined plurality of situation detection elements to which the surroundings data may be supplied;
    computational modeling of the surroundings of the vehicle being carried out using the situation detection elements, wherein the situation detection elements are collectively present together at one time, and, wherein each of the situation detection elements determines a respective model corresponding to one of a plurality of aspects of the surroundings such that each of the plurality of aspects is independent of each other and such that a sum of the models of the situation detection elements covers an entire field of action of the surroundings;
    driver assistance systems which are activatable using output data of the models of the situation detection elements;
    a decision-making unit using which it may be decided which output data of the models of the situation detection elements are used for activating an actuator unit of the vehicle; and
    an actuator unit of the vehicle which is activatable using the decided-upon output data.

11. The device as recited in claim 10, wherein the device is an electronic control unit of the vehicle.

12. A non-transitory computer-readable data carrier on which is stored program code for operating an automated vehicle, the program code, when executed by an electronic device, causing the electronic device to perform the following steps:
    detecting surroundings of the vehicle;
    providing surroundings data of the detected surroundings;
    supplying the surroundings data to a situation detection unit including a defined plurality of situation detection elements that are collectively present together at one time;
    computationally modeling the surroundings of the vehicle using the situation detection elements, wherein each of the situation detection elements determines a respective model corresponding to one of a plurality of aspects of the surroundings such that each of the plurality of aspects is independent of each other and such that a sum of the models of the situation detection elements covers an entire field of action of the surroundings;
    activating driver assistance systems using output data of the models of the situation detection elements;
    deciding, using a decision-making unit, which of the output data of the models of the situation detection elements are used for activating an actuator unit of the vehicle; and
    activating the actuator unit of the vehicle using the decided-upon output data.

* * * * *